A. L. BINGHAM.
GLASS WORKING MACHINE.
APPLICATION FILED JUNE 2, 1917.

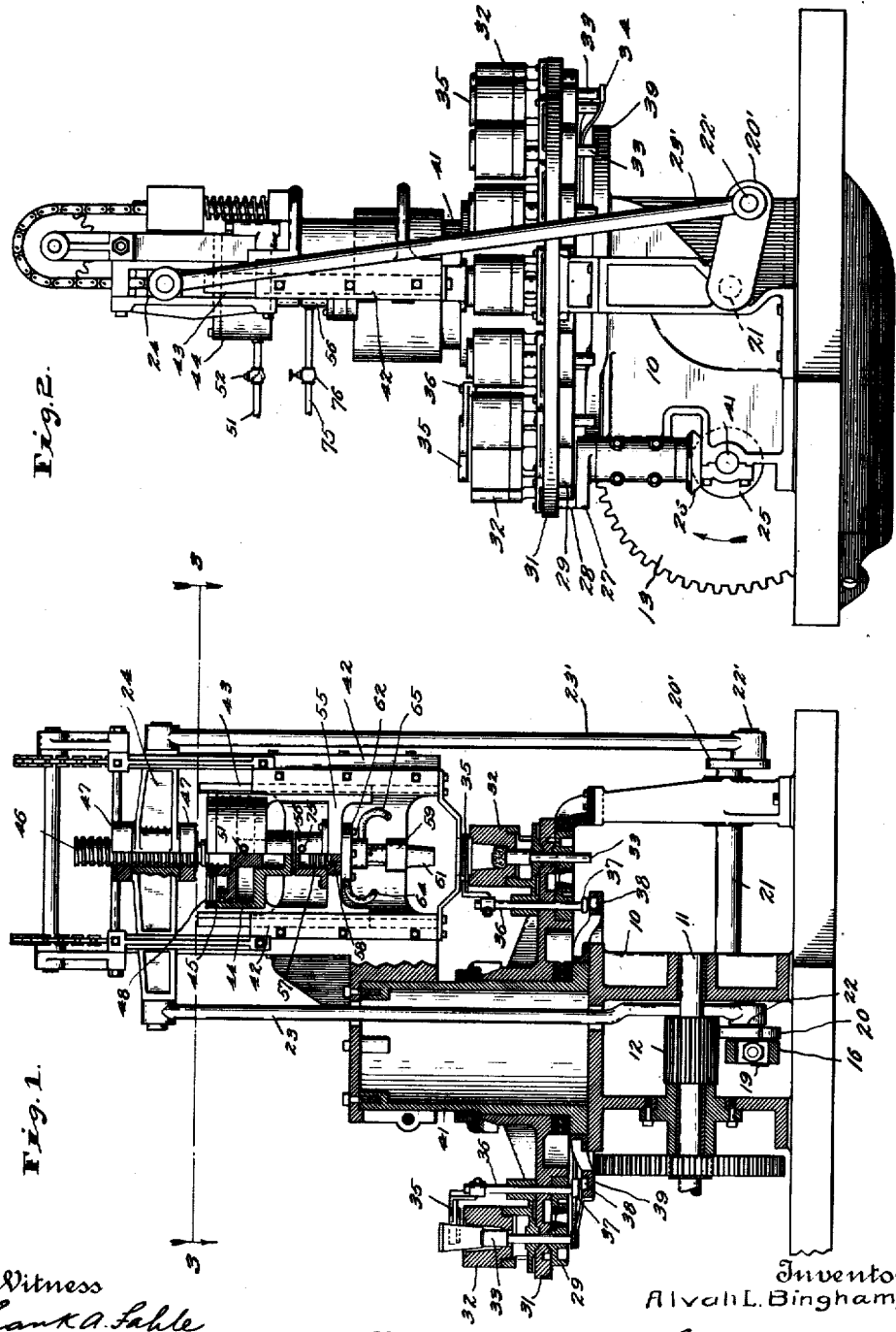

1,340,366.

Patented May 18, 1920.
4 SHEETS—SHEET 2.

Witness
Frank A. Sahle
Josephine Gasper

Inventor
Alvah L. Bingham,
By Hood & Schley
Attorneys

A. L. BINGHAM.
GLASS WORKING MACHINE.
APPLICATION FILED JUNE 2, 1917.

1,340,366.

Patented May 18, 1920.
4 SHEETS—SHEET 3.

Witness
Frank A. Sahle
Josephine Gasper

Inventor
Alvah L. Bingham,
By Hood & Schley
Attorneys

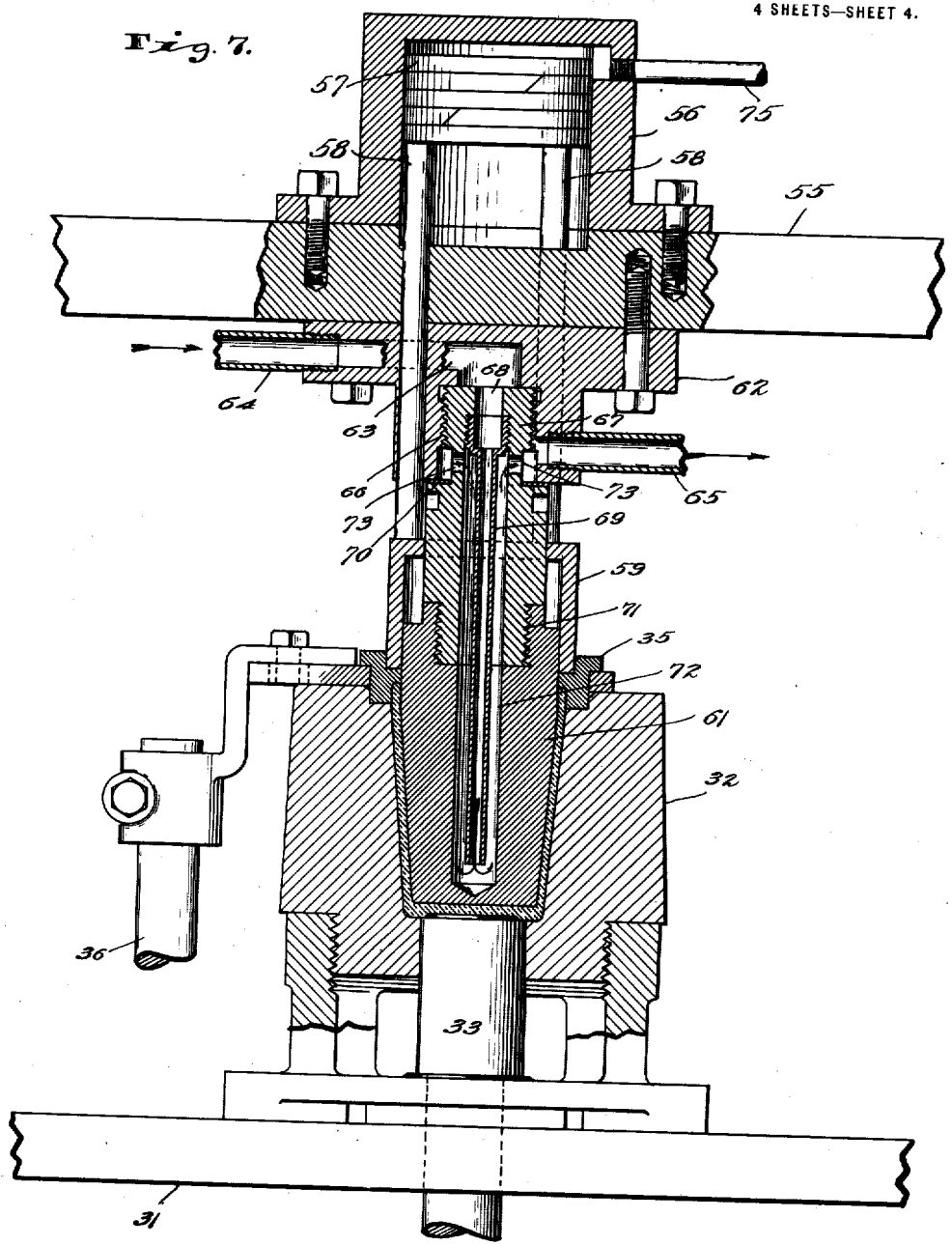

UNITED STATES PATENT OFFICE.

ALVAH L. BINGHAM, OF MUNCIE, INDIANA, ASSIGNOR TO BALL BROTHERS GLASS MANUFACTURING COMPANY, OF MUNCIE, INDIANA, A CORPORATION OF INDIANA.

GLASS-WORKING MACHINE.

1,340,366.      Specification of Letters Patent.      Patented May 18, 1920.

Application filed June 2, 1917. Serial No. 172,391.

*To all whom it may concern:*

Be it known that I, ALVAH L. BINGHAM, a citizen of the United States, residing at Muncie, in the county of Delaware and State of Indiana, have invented a new and useful Glass-Working Machine, of which the following is a specification.

The object of my invention is to produce a compact glass-working machine, in which a multiplicity of molds are successively brought to receiving, pressing and discharging positions, the invention comprising various details of construction, which facilitate the operation and insure a maximum output of marketable ware.

The accompanying drawings illustrate my invention.

Figure 3:
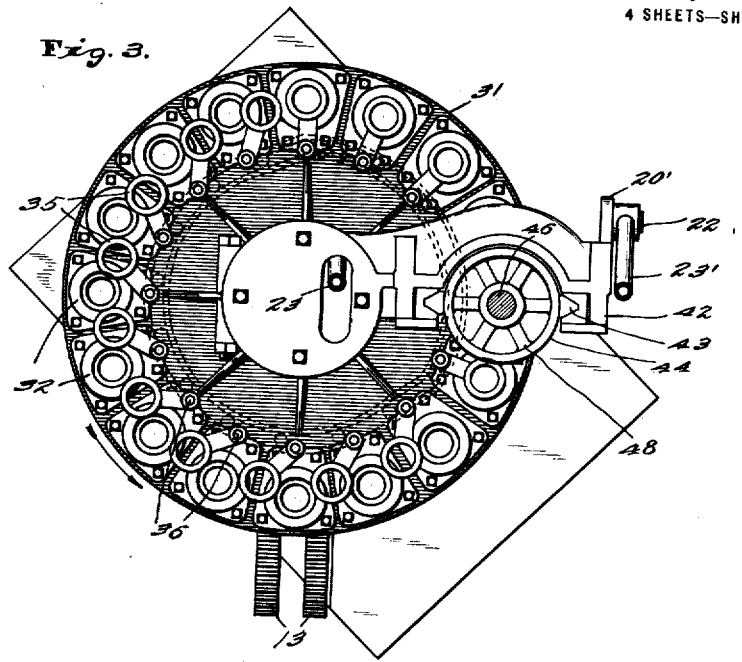
Figure 4:
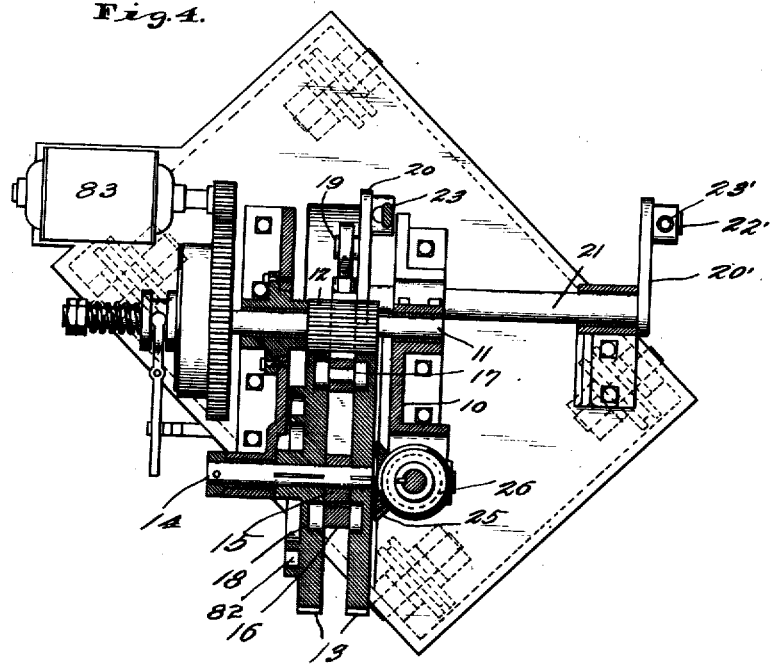
Figure 5:
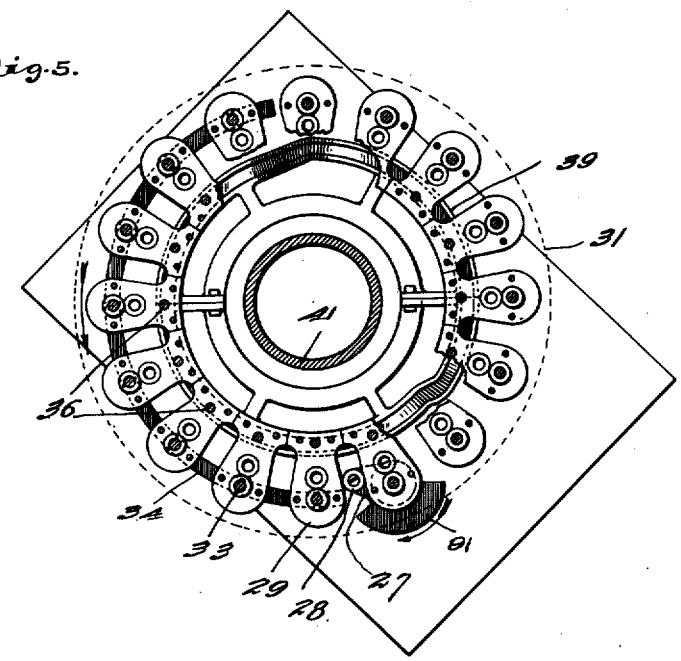
Figure 6:
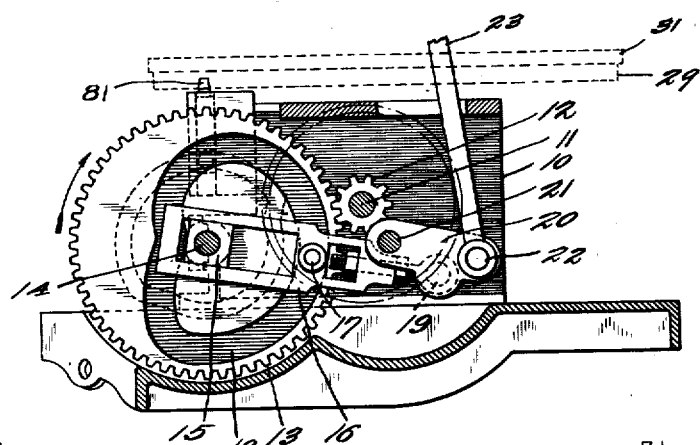

Figure 1 is an elevation, largely in vertical section, of my machine. Fig. 2 a side elevation; Fig. 3 a section on line 3—3 of Fig. 1; Fig. 4 a horizontal section in the shaft plane; Fig. 5 a horizontal section on a plane just beneath the mold table. Fig. 6 a vertical sectional detail of the driving gearing; and Fig. 7 a vertical section of my improved plunger mechanism and a coöperating mold.

In the drawings, 10 indicates a main frame in which is journaled a main drive shaft 11 carrying a pinion 12 meshing with gears 13 carried by shaft 14. Journaled on shaft 14 is a block 15 upon which is slidably mounted a slotted reciprocating arm 16 carrying a pin 17 which lies in cam slots 18 formed in gears 13. The outer end of arm 16 is pivotally connected at 19 to a lever 20 having a fixed rock shaft 21. The outer end of arm 20 carries a wrist pin 22 upon which is pivoted a pitman 23, the upper end of which is pivoted to the cross head 24. Rock shaft 21 also carries a lever 20′ provided with wrist pin 22′ upon which is mounted a pitman 23′ which is also pivoted to cross head 24. Shaft 14 carries a bevel gear 25 which meshes with a bevel gear 26 carried by a vertical shaft, upon the upper end of which is a crank arm 27 having a wrist pin 28 which is adapted to coact with a series of peculiarly formed teeth 29 carried by the mold table 31, such coaction resulting in an intermittent step-by-step forwarding movement of the table 31. Table 31 carries a multiplicity of molds 32 of any desired form, said molds in the present instance having ejecting plungers 33, the upper ends of which form parts of the bottoms of the molds and the lower ends of which are engaged by stationary cam 34 so as to be intermittently projected upwardly to discharge the completed ware as shown at the left in Fig. 1. Coöperating with the upper end of each mold is a ring 35 which is carried by a vertically reciprocating rock shaft 36 which is vertically reciprocable through table 31 and at its lower end carries a crank arm 37, provided with a wrist pin 38 which traverses cam 39 which is so formed as to give shaft 36 both an axial vertical reciprocation and an angular rocking, in order to intermittently swing the ring 35 into and out of alinement with the adjacent mold and down into coöperation with said mold, as shown in Fig. 7, or up out of coöperation with said mold, as shown at the left in Fig. 1.

The mold table 31 is journaled upon a central hollow standard 41 which forms part of the main frame 10, and the upper end of this standard carries vertical guides 42, 42 between which is mounted the vertically reciprocating head 43 which at its upper end is formed into a cylinder 44 having a vertical axis.

Mounted in this cylinder 44 is a piston 45 which carries a vertical threaded stem 46 which is projected up through the cross head 24 and carries adjusting nuts 47, 47, one of which engages the under side of cross head 24, while the other engages the upper side of said cross head. The upper end of cylinder 44 carries a spider 48, through which stem 46 is projected but which leaves free atmospheric access to the upper end of the cylinder 44. Air, or other suitable compressible fluid pressure, is introduced into cylinder 44 beneath piston 45 through pipe 51, in which there is a check valve 52 which opens inwardly toward cylinder 44. Mounted upon a cross arm 55 of head 43 is a cylinder 56 within which is mounted a piston 57. Piston 57 engages a plurality of piston rods 58 which are projected downwardly through suitable openings formed through cross bar 55 and carry a downwardly presented cup 59 adapted to engage ring 35 and drive it downwardly into the position shown in Fig. 7, where it coöperates with the mold 32 and plunger 61 to form a complete mold for the desired article which, in the present instance, is an ordinary pressed tumbler, or drinking glass.

Cross bar 55 carries a water head 62 having a water chamber 63, supply pipe 64 and discharge pipe 65. The water chamber 63 has a downwardly opening vertical portion which is threaded at 66 to receive the threaded upper end of a stem 67 which is centrally bored at 68. The upper end of bore 68 is threaded to receive the upper end of a tube 69 which extends downwardly through bore 68 and considerably beyond plug 67. Plug 67 is shouldered at 70 to close the lower end of the water chamber 63 and at its lower end is threaded at 71 to receive the plunger 61, said plunger having a bore 72 which forms a continuation of bore 68 and receives the lower end of tube 69. Openings 73 form a communication between bore 68 and the lower end of chamber 63, as clearly shown in Fig. 7. Air or other fluid pressure is supplied to the upper end of cylinder 56 through pipe 75 which is provided with a valve 76 which needs only to be very slightly opened so as to maintain a sufficient pressure within the upper end of cylinder 56 to normally hold piston 57 in its lowest position and yet permit the building up of a rather substantial pressure in the upper end of cylinder 56 during the short time when ring 35 needs to be held down in the position shown in Fig. 7.

The plunger 61 is vertically reciprocated primarily by the pitmen 23 and 23', but the total stroke of cross head 24 exceeds the total desired stroke of the plunger. Just before head 43 descends, the ring 35 of that mold which has been brought into position beneath plunger 61 will have been swung into vertical alinement with the mold and dropped into the upper end of the mold, as shown in Fig. 7. When the cross head 24 descends, plunger 61 will come into contact with the glass and at the same time, or just before the plunger 61 engages the glass in the mold 32, cup 59 will come into contact with ring 35 so as to hold it firmly in place, the piston 57 yielding upwardly and building up a sufficient fluid pressure within cylinder 56 to insure the maintenance of ring 35 is position. As the plunger 61 nears its lowest position, piston 45 will begin to move downwardly in cylinder 44 and build up a fluid pressure within the lower end of cylinder 44, check valve 52 preventing back flow. This built up pressure gradually increases as cross head 24 nears its lowest position, this increase depending upon the amount of glass within the mold 32 and any surplus being taken care of by the vertical yield of plunger 61.

In order to hold the table 31 against accidental displacement, I provide a vertically reciprocating pin 81 which is vertically reciprocated by means of a cam 82 properly timed in connection with the wrist pin 28.

It will be readily understood that any desired means may be used for driving pinion 12, driving means shown in the drawings comprising an electric motor 83.

In the operation of the machine, continuous rotation of the shaft which carries the crank arm 27 will cause intermittent step-by-step advancement of the table 31 so as to bring the molds 32 successively into position in alinement with plunger 61, each shaft 36 being automatically operated, both vertically and angularly by cam 39 to automatically shift each ring 35 into and out of coöperative relation with its mold.

When a mold reaches position in vertical alinement beneath plunger 61, cross head 24 will descend and drive plunger 61 into the alined mold through its ring 35, a suitable amount of air pressure being maintained within cylinders 44 and 56. The air pressure within cylinder 56 need be only sufficient to hold the neck ring 35 in place and in practice I find that a comparatively low pressure in the pipe line 75, with the valve 76 opened just a crack, will produce satisfactory results. The slight opening of the valve 76 is sufficient to compensate for leakage and offers sufficient resistance, at the time of upward yielding of piston 57, to permit a considerable building up of pressure within cylinder 56. The cracking of the valve, however, offers an outlet, against the supply pressure, to prevent too great a pressure within the cylinder.

The air pressure in the cylinder 44 is introduced through the check valve 52 and the supply pressure through the pipe line 51 is sufficient to give an initial pressure within the cylinder just sufficient to cause easy entry of the plunger 61 into the mass of glass in the mold, while the relative upward movement of cylinder 44 relative to piston 45 is so proportioned that the amount of pressure which may be built up within the cylinder by this relative movement will be sufficient to properly press the glass irrespective of variations in quantities within the mold.

The ejecting plungers 33 of the molds, when not supported by the track 34, project a considerable distance below the table, as shown at the right in Fig. 1, and in Fig. 2. It is necessary, of course, to carry these pins in their elevated condition beyond the path of movement of crank 27, and therefore, track 34, as shown in Fig. 5, is carried to a point closely adjacent the path of movement of wrist pin 28 and the arm 27 is provided with an arc-shaped tail 91 which has a radius substantially equal to the radius of arm 27 and serves to form a bridge over which the pins 33 will travel to a point beyond the range of the outer end of arm 27, whereupon said pins will drop from off the tail 91 as the plungers are moved to the right in Fig. 5.

I claim as my invention:

1. In a glass-working machine, the combination with a series of molds and means for bringing the same successively into pressing position, a pressing plunger adapted to coöperate successively with said molds, a reciprocating cross head, a cylinder-and-piston connection between the cross head and plunger, means for supplying light compressible fluid pressure between the cylinder and piston, a ring arranged to coöperate with the mold, a pressure ring adapted to engage said mold ring, a cylinder-and-piston connection between said pressure ring and plunger, and means for supplying light compressible fluid pressure exceeding atmospheric between the last-mentioned piston and cylinder.

2. In a glass-working machine, the combination with a series of molds and means for bringing the same successively into pressing position, a pressing plunger adapted to coöperate successively with said molds, a reciprocating cross head, a cylinder-and-piston connection between the cross head and plunger, and means for supplying light compressible fluid pressure exceeding atmospheric between the cylinder and piston.

3. In a glass-working machine, a pressing plunger comprising a reciprocating carrying head, a pressing member carried thereby, a cylinder carried by said carrying head, a reciprocating operating head, a piston carried by said operating head and fitted within the cylinder, means for suspending the weight of the carrying head on the operating head permitting relative axial displacement between the piston and cylinder, and means for supplying light compressible fluid pressure exceeding atmospheric to the space between the piston and cylinder.

4. In a glass-working machine, the combination with a rotary table, a plurality of molds carried by said table, and means for rotating said table to bring its molds into successive operative positions, of a ring mold for each mold, a vertically reciprocable rock shaft for each ring mold, a crank carried by each rock shaft, and a single cam engaging said cranks and acting directly, upon rotation of the table, to automatically shift the shafts axially and angularly to automatically throw the ring molds into and out of coöperating position relative to their respective molds.

5. In a glass-working machine, the combination of a rotary table carrying a plurality of molds each having a vertically reciprocable member extending beneath the table, of a track supporting said members in elevated positions for a portion of travel of the table, an operating shaft carrying a member having a portion forming, at times, an extension of said track, a wrist pin carried by said member, and a circular series of teeth carried by the table, each of said teeth having an arc-shaped end with a radius equal to the distance between the axis of the operating shaft and the nearest point of the wrist pin and having adjacent parallel side edges spaced apart a distance substantially equal to the diameter of the wrist pin.

6. In a glass-working machine, the combination with a series of molds and means for bringing the same successively into pressing position, a pressing plunger adapted to coöperate successively with said molds, a reciprocating cross head, a cylinder-and-piston connection between the cross head and plunger, means for supplying fluid pressure between the cylinder and piston, a ring arranged to coöperate with the mold, a pressure ring adapted to engage said mold ring, a cylinder-and-piston connection between said pressure ring and plunger, means for supplying fluid pressure between the last-mentioned piston and cylinder, and means in the last said fluid pressure supply means for restricting outflow, whereby a pressure greater than the supply pressure may be intermittently built up and reduced.

7. In a glass-working machine, the combination with a series of molds and means for bringing the same successively into pressing position, a pressing plunger adapted to coöperate successively with said molds, a reciprocating cross head, a cylinder-and-piston connection between the cross head and plunger, means for supplying fluid pressure between the cylinder and piston, and means in the fluid pressure supply means for checking backflow, whereby a pressure greater than the supply pressure may be intermittently built up and reduced.

8. In a glass-working machine, a pressing plunger comprising a reciprocating carrying head, a pressing member carried thereby, a cylinder carried by said carrying head, a reciprocating operating head, a piston carried by said operating head and fitted within the cylinder, means for suspending the weight of the carrying head on the operating head permitting relative axial displacement between the piston and cylinder, means for supplying fluid pressure to the space between the piston and cylinder, and means in the fluid pressure supply means for checking backflow, whereby a pressure greater than the supply pressure may be intermittently built up and reduced.

9. In a glass-working machine, the combination with a mold and coöperating mold ring, of a pressure ring, a reciprocating operating member, a piston-and-cylinder connection between said reciprocating operating member and pressure ring, means for supplying fluid pressure to the space between the cylinder and piston, and means in the fluid pressure supply means for restricting backflow, whereby a pressure greater than the supply pressure may be intermittently built up and reduced.

10. In a glass-working machine, a press plunger structure comprising a vertically reciprocatory cross head, a piston carried by said cross head and vertically adjustable therein, a cylinder receiving said piston, a fluid supply pipe leading into said cylinder below the piston, vertical guides for said cylinder, a second cylinder carried by said first cylinder, a piston mounted in said second cylinder, a fluid supply pipe leading into said second cylinder above the piston, means for limiting the downward movement of the press plunger relative to the cylinder, and means carried by the press plunger and projecting into unconnected engagement with the piston in the second cylinder, substantially as described.

11. In a glass-working machine, a press plunger structure comprising a vertically reciprocatory cross head, a piston carried by said cross head and vertically adjustable therein, a cylinder receiving said piston, a fluid supply pipe leading into said cylinder below the piston, vertical guides for said cylinder, a second cylinder carried by said cylinder, a piston mounted in said second cylinder, a fluid supply pipe leading into said second cylinder above the piston, means for limiting the downward movement of the press plunger relative to the cylinders, and means carried by the press plunger and projecting into engagement with the piston in the second cylinder, substantially as described.

In witness whereof, I have hereunto set my hand at Muncie, Indiana, this eighth day of May, A. D. one thousand nine hundred and seventeen.

ALVAH L. BINGHAM.